Patented May 14, 1940

2,201,112

UNITED STATES PATENT OFFICE 2,201,112

TREATMENT OF HYDROGENATED OILS

Sidney Musher, New York, N. Y., assignor to Musher Foundation Incorporated, New York, N. Y., a corporation of New York No Drawing. Application June 30, 1939, Serial No. 282,081

4 Claims. (Cl. 99—123)

This invention relates to the treatment of hydrogenated oils in substantially solid, plastic, fatty and/or waxy form in order to enhance their frying odors and flavors.

In the case of the hydrogenated shortenings and those particularly made from cottonseed oil, by the time those oils have been put through the usual refining treatment including causticizing, bleaching, hydrogenating and deodorizing, such shortenings are comparatively odorless and flavorless and frequently take on objectionable hydrogenated odors when used in the home for deep fat frying, or in the manufacture of pie crust or for similar baking purposes. This objectionable odor developing from the hydrogenated shortenings is particularly to be observed with hydrogenated cottonseed oil shortening and develops when the oil is subjected to an elevated temperature during the frying operation, such as when the shortening reaches a temperature of between 275° F. and 350° F.

An object of this invention is to reduce the development of the characteristic hydrogenated odor and taste in the shortening as well as in the fried or baked product with which the shortening is used.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with this invention, it has been found possible to incorporate a small amount of unroasted specially treated sesame seed in the hydrogenated oil in substantially uniform dispersion to produce a new flavored oil having a distinctly different odor in frying, which sesame seed will remain in uniform dispersion even when the oil is molten or melted and will not cause objectionable discoloration.

The sesame seed is first decorticated in order to remove the outer hull. This is desirably done by subjecting the sesame to a cracking process whereby the individual seed is cracked and then subjected to a current of air in order to blow away the much lighter hull from the sesame.

The decorticated sesame seed is then subjected to a drying operation which must be conducted at a low temperature in order to prevent any roasting from taking place. The temperature of the drying should not exceed about 220° F. at atmospheric pressure and should preferably be conducted under reduced pressure and at temperatures not over about 140° to 160° F. in order to avoid any roasting effect.

The moisture content of the decorticated sesame seed should be reduced to less than 15% and desirably to less than 10%.

The sesame seed that has been thus decorticated and dehydrated is then subjected to a fine rolling or milling operation. This is preferably accomplished by placing the sesame seed between iron or stone rollers so that the individual cells of the sesame are broken in two, releasing the oil contained therein and this rolling is continued until a fine paste is formed. Preferably, the upper roll operates at a different speed than the lower roll in order to cause a grinding and crushing operation and to more thoroughly macerate the sesame and produce a break-down of the cell structure to enable the entire sesame seed to be ground to a finely macerated condition.

Desirably at this point the macerated sesame should be put through a colloid mill in order more thoroughly to grind and subdivide the sesame solids.

The macerated sesame thus obtained has a mild pleasing odor and a slightly bitter taste, but does not show any roast characteristics nor any dark color other than a slight gray that is characteristic of this particular material.

In the preparation of the sesame, care must be exercised that after the decorticating and during the drying, the temperature of the drying operation should be no higher than about 220° F. because otherwise a roasted odor and flavor will appear which is most objectionable.

In addition, following the drying operation, the sesame must be macerated to a sufficiently fine form so that when rubbed between the fingers, no individual particles of the sesame can be felt.

The decorticated, dehydrated, macerated sesame is then added to the hydrogenated cottonseed oil, following the last stage in the processing of the hydrogenated cottonseed oil and after deodorization, in a very small amount, less than 5%, and desirably in an amount of about 1% or less.

The macerated sesame is added to the hydrogenated cottonseed oil while the cottonseed oil is in a molten condition and preferably is added when the cottonseed oil is at about 200° F. to 210° F. Where the hydrogenated cottonseed oil is at a low temperature, following the addition of the macerated sesame thereto, the hydrogenated cottonseed oil containing the sesame should be heated to the temperature of about 200° F. to 210° F. as this is the temperature that is desired in order to bring out the full characteristic aromatic flavoring property in the hydrogenated cottonseed oil without developing any burnt flavor, and in order to prevent the occurrence of the objectionable hydrogenated odor and flavor characteristics.

The macerated sesame must be thoroughly admixed in the hydrogenated cottonseed oil. Preferably, following the addition of the sesame to the shortening, the mixture is put through a colloid mill in order to spread more thoroughly the individual particles of the sesame through the shortening and to obtain a more thorough admixture of the sesame in the shortening, whereby there is imparted to the shortening the most desirable characteristics with the least quantity of the sesame.

When the sesame is heated in the shortening to the temperature of 200° F. to 210° F. and held at that temperature for a short period, such as for about 5 minutes, the shortening containing the macerated sesame may then be cooled down to a temperature just above its solidifying point and then applied to the chilled surface of a roll, removed from that roll and plasticized, churned or beaten up in order to incorporate therein a small amount of air ranging up to about 5% to 10% and then filled into the finished containers.

The shortening containing the macerated sesame prepared in this manner does not have a very noticeable aroma or flavor in its condition when made or when packed and there is but very little difference in appearance between hydrogenated cottonseed oil containing, for example, 1% of the macerated sesame prepared in the aforesaid manner, and the hydrogenated shortening when prepared without the sesame.

However, when that hydrogenated shortening containing the macerated sesame is used for cooking, frying or baking purposes, there is imparted to the baked or fried products a highly desirable aroma and flavor that is characteristic of the type of flavor and aroma that is given to baked, cooked or fried products when fine butter is used, although the flavor and odor is not a "butter" flavor and aroma.

When, for example, the treated hydrogenated shortening is used in the manufacture of a pound cake, the pound cake has in accentuated form the fine flavor of the various ingredients including the essential oil ingredients contained therein and has a much superior and more appetizing flavor and aroma than pound cake made with ordinary shortening without the macerated sesame.

In addition, when the treated shortening is used for deep fat frying purposes, even though that shortening contains a small amount of sesame solids as, for example, when using 1% of the macerated sesame, the cottonseed shortening containing approximately 0.35% by weight of sesame solids, nevertheless because of the special preparation of the sesame as aforementioned, there will not be developed any burning or scorching of the sesame solids at the bottom of the frying pan. This is most unusual because it would normally be expected that any oil insoluble material present in the shortening would certainly produce burning, but with the amount that is utilized, such as about 1% to 2%, and with the sesame macerated in the special manner indicated above, there will be substantially no residue at the bottom of the frying pan as the individual particles of the sesame are apparently maintained in thorough suspension in the shortening without becoming deposited and without material charring on the frying pan.

In addition, whereas ordinary hydrogenated cottonseed and other shortenings have a most objectionable hydrogenated odor when used for the manufacture of pie crust, or when used for deep fat frying, such hydrogenated odor being characteristic of a "rubberiness" which is most objectionable, the use of the macerated sesame in the hydrogenated cottonseed oil overcomes this "rubberiness" and objectionable hydrogenated odor.

Moreover, the flavor and aroma of the shortening containing the macerated sesame is sweet and has a rather indistinguishable or undefinable odor and flavor when used in the cooking operation. It is not the characteristic odor and flavor of sesame or of sesame oil, but seems to take on an entirely new and different and distinctive flavor and odor that has a certain sugar sweetness or candy-like aroma that is highly desirable and that is particularly desirable for use in connection with a product of this nature that is commonly used for cooking, baking and frying purposes.

From the standpoint of keeping quality, it has also been observed that the specially prepared macerated sesame in the hydrogenated shortening, when heated to the temperature of between 200° F. and 210° F. before being allowed to chill and run over the rolls, will very materially increase the resistance of the shortening to rancidity. When the sesame seed in macerated form is added to the shortening after the shortening has been allowed to cool and merely admixed in the shortening, there is not given to that shortening the full desirable aromatic and flavoring constituents, nor is there given to the shortening the fully desirable keeping quality properties which are given to the shortening by adding the macerated sesame thereto and heating to a temperature of 200° F. to 210° F. while the shortening is in molten liquid form and before cooling to room temperature and using.

It is desirable not only to mix the sesame in macerated form thoroughly through the hydrogenated shortening, but also to keep the sesame in the shortening during the entire period of storage and through the period of final consumption.

It is important that the sesame be kept thoroughly admixed throughout the molten shortening and for this agitation to be continued up to the time that the shortening is applied to the chilling rolls.

Although it is particularly desirable to use the macerated sesame in connection with hydrogenated cottonseed oil shortening, the sesame may also be applied to other types of solid or plastic, waxy, fatty materials, and preferably those which have been in whole or in part hydrogenated, such as compound or hydrogenated shortenings produced from cottonseed, corn, peanut, sesame, sunflower seed, soya bean, or other glyceride oils and fats.

The present application is a continuation in part of application, Serial No. 123,315, filed January 30, 1937, and through said application continues the subject matter of application, Serial No. 696,915, filed November 6, 1933, which matured into Patent 2,093,971 on September 21, 1937, and application, Serial No. 698,543, filed November 17, 1933, which matured into Patent No. 2,069,265 on February 2, 1937.

Having described my invention, what I claim is:

1. A hydrogenated shortening composition, having a desirable flavor and odor and improved frying and baking characteristics, carrying thoroughly dispersed therethrough a small amount, less than 5%, of decorticated, low moisture containing, macerated sesame seeds.

2. A plastic, hydrogenated, cottonseed oil shortening composition, having a desirable flavor and odor and improved frying and baking characteristics, carrying thoroughly dispersed therethrough about 1% of unroasted, decorticated, low moisture containing, macerated sesame seeds.

3. A method for producing novel plastic hydrogenated shortening compositions having a desirable flavor and odor and improved frying and baking characteristics, which comprises adding a small amount, less than 5%, of decorticated, macerated sesame seeds to the shortening after hydrogenation and deodorizing and while the shortening is in a molten condition, thoroughly dispersing the macerated sesame seeds therethrough and then chilling and forming a plastic mass of the hydrogenated shortening composition containing the macerated sesame seeds.

4. A method for producing novel plastic hydrogenated cottonseed oil shortening compositions having a desirable flavor and odor and improved frying and baking characteristics, which comprises adding a small amount, less than 5%, of decorticated, macerated sesame seeds to the shortening after hydrogenation and deodorizing and while the shortening is in a molten condition, thoroughly dispersing the macerated sesame seeds therethrough and then chilling and forming a plastic mass of the hydrogenated shortening composition containing the macerated sesame seeds.

SIDNEY MUSHER.